Patented July 20, 1937

2,087,425

UNITED STATES PATENT OFFICE 2,087,425

MONOAZODYESTUFFS

Otto Bayer, Leverkusen-on-the-Rhine, Richard Fleischhauer, Frankfort-on-the-Main-Fechenheim, and Detlef Delfs, Leverkusen-on-the-Rhine, Germany, assignors to General Aniline Works, Inc., New York, N. Y., a corporation of Delaware No Drawing. Application January 22, 1934, Serial No. 707,846. In Germany January 24, 1933

6 Claims. (Cl. 260—92)

This invention relates to monoazodyestuffs more particularly to those containing alkoxyacylamino groups.

These dyestuffs are obtained by combining a diazo-component of the benzene series with a coupling component of the pyrazolone or naphthalene series, at least one of which components contains an alkoxyacylamino group. They may also be prepared by producing monoazodyestuffs the components of which contain at least one primary or secondary amino group and thereafter treating the products thus obtained with an alkyloxyacyl-halogenide or -anhydride.

As suitable diazo-components containing an alkoxyacylamino group may be named those corresponding to the general formula:

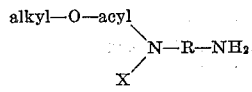

(wherein R means a benzene nucleus which may contain sulfonic acid, methyl or methoxy groups and X means hydrogen, alkyl, aralkyl, cycloalkyl or aryl, i. e. for instance: 1-methoxyacetylamino-4-aminobenzene, 1-methoxyacetylethylamino-4-aminobenzene, 4-methoxyacetylamino-2-amino-1-methylbenzene, 1-methoxyacetylcyclohexylamino-4-aminobenzene, 1-ethoxyacetylamino-4-aminobenzene, 1-ethoxyacetylamino-4-aminobenzene-3-sulfonic acid, 1-β-methoxybutyrylamino-3-aminobenzene, 1-methoxyacetylbenzylamino-4-aminobenzene, 1-methoxyacetylphenylamino-4-aminobenzene, 1-methyl-2-amino-4-methoxy-5-methoxyacetylaminobenzene, 1,4-dimethoxy-2-amino-5-methoxyacetylaminobenzene.

As suitable coupling components containing an alkoxyacylamino group may be named those corresponding to the general formula:

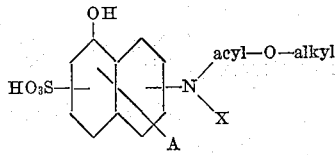

(wherein X means hydrogen or alkyl and A hydrogen or a sulfonic acid group) i. e. for instance the condensation products of methoxy acetic acid anhydride with 1-amino-8-naphthol-3,6-disulfonic acid, 1-amino-8-naphthol-4,6-disulfonic acid, 1-amino-5-naphthol-7-sulfonic acid, 2-amino-5-naphthol-7-sulfonic acid, 2-methylamino-5-naphthol-7-sulfonic acid, 2-amino-8-naphthol-6-sulfonic acid.

The new dyestuffs dye animal fibers as wool or silk clear yellow, orange, red, violet or brown shades. The shades are generally more yellowish than those of dyestuffs containing no alkoxy group attached to their acyl group. Those of the dyestuffs containing the alkoxyacylamino group attached to their coupling component show a good levelling power especially when compared with the corresponding dyestuffs containing an halogen-acylamino group instead of the alkoxy-acylamino group.

In order to further illustrate our invention the following examples are given, the parts being by weight; but we wish it, however, to be understood that our invention is not limited to the particular conditions nor specific products mentioned therein.

Example 1

20.7 parts of 1-methoxyacetyl-ethylamino-4-aminobenzene, prepared for example by acting with methoxyacetic acid anhydride on 1-ethyl-amino-4-nitrobenzene and subsequently reducing the obtained nitro-compound, are diazotized in the usual manner. The obtained diazo solution is allowed to run into a sodium carbonate solution of 35 parts of 2-(4'-methoxyphenylamino)-8-naphthol-6-sulfonic acid. The dyestuff thus obtained forms after isolating and drying a dark water-soluble powder dyeing wool levelling yellowish brown shades.

By using instead of 2-(4'-methoxyphenylamino)-8-naphthol-6-sulfonic acid the equivalent amount of 2-phenylamino-8-naphthol-6-sulfonic acid a dyestuff of a like good levelling power but of a more reddish brown shade is obtained.

Similar brown dyestuffs are obtained by using as diazo-components 1-methoxyacetylamino-4-aminobenzene or 1-methoxyacetylamino-4-aminobenzene-3-sulfonic acid or 1-ethoxyacetylamino-4-aminobenzene-3-sulfonic acid, β-methoxybutyrylamino-3-aminobenzene.

Example 2

9.2 parts of aniline are diazotized. The obtained diazo solution is allowed to run while cooling by means of ice into a sodium carbonate solution of 36 parts of 1-methoxyacetylamino-8-naphthol-4,6-disulfonic acid. The dyestuff thus obtained forms after isolating and drying a red water-soluble powder dyeing wool from an acid bath levelling bright red shades.

With 1-methoxyacetylamino-8-naphthol-3,6-disulfonic acid a more bluish dyestuff is obtained.

The dyestuff described in the first paragraph may also be obtained by acting with methoxy acetic acid anhydride under suitable conditions on the dyestuff obtained by combining diazotized aniline with 1-amino-8-naphthol-4,6-disulfonic acid in the presence of sodium carbonate.

The following table shows the shades of some further dyestuffs which are produced according to the present process:—

—NXCOCH$_2$—O—alkyl is attached to the naphthalene radical and which contain substituents selected from the group consisting of methyl, methoxy and sulphonic acid groups in the benzene nucleus when radical —NXCOCH$_2$—O—alkyl is attached to the benzene nucleus, which dyestuffs dye animal fibers clear yellow, orange, red, violet to brown shades.

*Dyestuffs, containing the alkoxyacylamino group in the diazo-component*

| Coupling-components | Diazo-components | | | |
|---|---|---|---|---|
| | 1-methoxy-acetylamino-4-aminobenzene | 1-methoxy-acetylamino-4-aminobenzene-3-sulfonic acid | 1-methoxy-acetylethylamino-4-aminobenzene | 1-methoxy-acetyl-cyclohexylamino-4-aminobenzene |
| 1-(2'-chloro-5'-sulfophenyl)-3-methyl-5-pyrazolone. | Yellow | Yellow | Yellow | Yellow |
| 2-naphthol-6,8-disulfonic acid | Yellowish red | | Orange | Orange |
| 1-acetylamino-8-naphthol-4,6-disulfonic acid. | Reddish violet | Bluish red | Bluish red | Bluish red |
| 1-acetylamino-8-naphthol-3,6-disulfonic acid. | Reddish violet | | Bluish red | Bluish red |
| 1-naphthol-4-sulfonic acid | Red | Red | Red | Red |
| 1-naphthol-3,6-disulfonic acid | Red | Red | Red | |
| 2-amino-8-naphthol-6-sulfonic acid (coupled in an acid medium). | | Bluish red | Red | |
| 2-(2'-methoxy-phenylamino)-8-naphthol-6-sulfonic acid. | Reddish brown | Violet brown | Brown | Brown |
| 1-toluene-sulfamino-8-naphthol-3,6-disulfonic acid. | Reddish violet | Violet red | Violet red | Bluish red |

*Dyestuffs, containing the alkoxyacylamino group in the coupling component*

| Diazo-components | Coupling components | | | |
|---|---|---|---|---|
| | 1-methoxy-acetylamino-8-naphthol-3,6-disulfonic acid | 1-methoxy-acetylamino-8-naphthol-4,6-disulfonic acid | 2-methoxy-acetylamino-5-naphthol-7-sulfonic acid | 2-methoxy-acetylamino-8-naphthol-6-sulfonic acid |
| Aniline | | | Orange | Yellowish red |
| o-Toluidine | Bluish red | Bluish red | | |
| p-Toluidine | Bluish red | | | |
| 2-chloro-4-amino-toluene | Bluish red | Bluish red | | |
| 4-chloro-2-amino-toluene | Bluish red | Bluish red | | |
| Anthranilic acid | Bluish red | Red | | |
| p-Xylidine | Bluish red | | | |
| 2-chloro-5-amino benzoic acid | Bluish red | Bluish red | | |
| 4-chloro-2-amino-anisol | Pink | | | |
| 2-amino-diphenylether | Pink | Bluish red | | |
| 4-amino-diphenylether | Pink | Bluish red | Reddish orange | Red |
| 4-amino-diphenylether-2-sulfonic acid | Bluish red | Bluish red | Reddish orange | Red |
| 4-amino-diphenylether-3-sulfonic acid | Pink | Bluish red | Reddish orange | Red |
| 1-ethylacetylamino-4-aminobenzene | Red | Red | | |
| 1-ethyl-benzoylamino-4-aminobenzene | Bluish red | Bluish red | | |
| 4-aminotoluene-3-sulfanilide | | Bluish red | | |
| Aniline-3-sulfanilide | | Yellowish red | | |
| o-Amino-diphenylsulfone | | Yellowish red | | |
| 1-ethyl-methoxy-acetylamino-4-aminobenzene. | | Red | | |
| 1-cyclohexyl-acetylamino-4-aminobenzene | | Red | Orange | Red |

We claim:—

1. Monoazodyestuffs of the group consisting of compounds of the general formula:

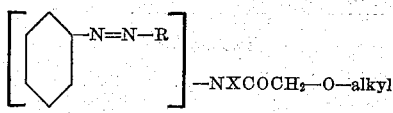

wherein R represents a coupling component of the naphthalene series, X represents a member selected from the group consisting of hydrogen and alkyl and the radical —NXCOCH$_2$—O—alkyl is attached to either the benzene nucleus or to the radical represented by R, and their substituted compounds which contain a substituent selected from the group consisting of halogen, methyl, methoxy, acylamino and sulphonic acid group in the benzene nucleus, when the radical 2. Monoazodyestuffs of the group consisting of compounds of the general formula

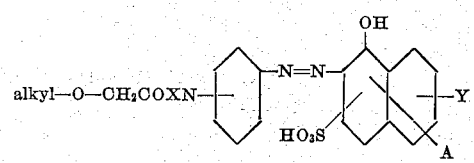

wherein X represents a member selected from the group consisting of hydrogen and alkyl, A represents a member selected from the group consisting of hydrogen and the sulfonic acid group and Y represents a member selected from the group consisting of hydrogen and a substituted amino group, and their substituted compounds which contain a substituent selected from the group consisting of methyl, methoxy and sulfonic acid groups in the benzene nucleus, which dyestuffs dye animal fibers clear yellow, orange, red, violet to brown shades.

3. The monoazodyestuff of the formula:

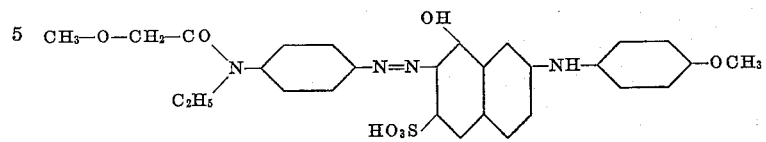

which dyestuff dyes wool yellowish brown levelling shades.

4. The monoazodyestuff of the formula:

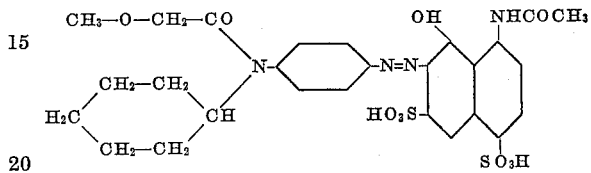

which dyestuff dyes wool bluish red levelling shades.

5. The monoazodyestuff of the formula:

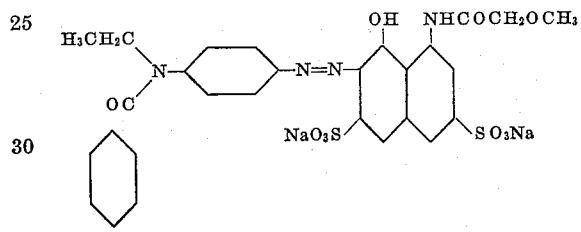

which dyestuff dyes wool bluish red levelling shades.

6. Monoazodyestuffs of the group consisting of compounds of the general formula:

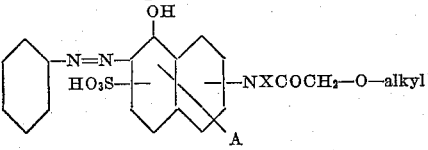

wherein X represents a member selected from the group consisting of hydrogen and alkyl, A represents a member selected from the group consisting of hydrogen and the sulfonic acid group, and their substituted compounds which contain a substituent selected from the group consisting of halogen, methyl, methoxy, acyl-, amino and sulfonic acid groups in the benzene nucleus, which dyestuffs dye animal fibers clear yellow, orange, red, violet to brown shades.

OTTO BAYER.
RICHARD FLEISCHHAUER.
DETLEF DELFS.